US006902641B1

(12) United States Patent
Patel et al.

(10) Patent No.: US 6,902,641 B1
(45) Date of Patent: Jun. 7, 2005

(54) METHOD OF LABELLING AN ARTICLE

(75) Inventors: Mukund R. Patel, Hudson, MA (US); Robert E. Lafler, Charlton City, MA (US)

(73) Assignee: Gotham Ink Corporation, Marlboro, MA (US)

(*) Notice: Subject to any disclaimer, the term of this patent is extended or adjusted under 35 U.S.C. 154(b) by 0 days.

(21) Appl. No.: 10/353,191

(22) Filed: Jan. 28, 2003

Related U.S. Application Data

(62) Division of application No. 10/038,214, filed on Jan. 3, 2002, now Pat. No. 6,797,747.

(51) Int. Cl.[7] .............................. B32B 3/00; B32B 9/00

(52) U.S. Cl. ........................ 156/230; 156/238; 156/240; 156/272.2; 156/277; 156/289

(58) Field of Search ................................ 156/230, 238, 156/239, 240, 241, 247, 272.2, 277, 289; 427/146, 147, 148; 428/195, 211, 202, 343, 355, 356, 914; 528/86, 87, 89, 90, 104

(56) References Cited

U.S. PATENT DOCUMENTS 4,321,185 A 3/1982 Benitez
4,358,578 A * 11/1982 Brownscombe .............. 528/91
4,511,682 A 4/1985 Mayer et al.
4,536,434 A 8/1985 Magnotta
4,555,436 A 11/1985 Geurtsen et al.
4,927,709 A 5/1990 Parker et al.
4,935,300 A 6/1990 Parker et al.
4,976,813 A 12/1990 Salensky et al.
5,104,719 A * 4/1992 Kamen et al. ........... 428/195.1
5,800,656 A 9/1998 Geurtsen et al.
5,824,176 A 10/1998 Stein et al.
5,919,834 A * 7/1999 Downs et al. ................ 522/33
5,968,689 A 10/1999 Torikoshi et al.
5,989,700 A 11/1999 Krivopal
6,033,763 A 3/2000 Laprade et al.
6,099,944 A 8/2000 Laprade et al.
6,171,429 B1 * 1/2001 Aindow et al. ............. 156/234
6,322,620 B1 11/2001 Xiao
6,537,651 B2 3/2003 Geurtsen et al.
2003/0134110 A1 7/2003 Laprade

* cited by examiner

*Primary Examiner*—Sue A. Purvis
(74) *Attorney, Agent, or Firm*—Cowan Liebowitz & Latman; Mark Montague

(57) ABSTRACT

A method of labelling an article is carried out by providing a heat-transfer label that includes a support portion and a transfer portion over the support portion for transfer of the transfer portion from the support portion to the article upon application of heat to the support portion while the transfer portion is placed in contact with the article. The transfer portion comprises a single or multiple color design. The transfer portion then is transferred from the support portion to the article. The method is particularly well-suited with silane-treated glass containers of the type that are subjected to pasteurization conditions, regardless of whether the glass containers have been pre-treated previously with polyethylene, oleic acid, stearate or the like.

3 Claims, 1 Drawing Sheet

METHOD OF LABELLING AN ARTICLE

RELATED APPLICATION

The application is a division of U.S. patent application Ser. No. 10/038,214 filed Jan. 3, 2002, and issued as U.S. Pat. No. 6,797,747, the disclosure of which is incorporated herein by reference.

FIELD OF THE INVENTION

This application is directed to coating systems for applying labels to bottles and aluminum cans. More particularly, this application is directed to heat-activatable labeling systems formed from blends of epoxy and phenoxy resins, polyester resins, or vinyl chloride-vinyl acetate polymers. The labels are fabricated from pigmented resin coatings that provide heat activatable and abrasion resistant features without requiring separate thermoplastic adhesive and protective, abrasion resistant layers or extensive heat curing conditions.

BACKGROUND OF THE INVENTION

Current labels being used for heat transfer application to glass, plastic, and aluminum containers are manufactured by applying to a release-coated substrate multi-layer components including a heat activatable adhesive layer, colored solid or design areas, and a clear, abrasion resistant protective topcoat to prevent scratching and marring during the filling or subsequent contact of the labelled containers. Use of this system results in substantial raw material, printing and coating costs as well as potential inter layer adhesion problems associated with bonding of the ink layers to the adhesive and topcoat lacquer. Thus, there is a need for a more economical labelling-system that can be manufactured more easily while providing required resistance properties without requiring costly post-curing conditions.

OBJECTS OF THE INVENTION

It is an object of the invention to provide a labelling system that will not require separate printing and coating stations requiring added raw material adhesive and protective coated areas with associated drying and print registration problems.

It is also an object of the invention to improve the quality of the label by eliminating any potential interlayer adhesion deficiencies during processing and storage of the containers.

It is a further object of the invention to provide a method of producing labels that have improved resistance to solvents and other chemicals and that are non-hazing, clear, and glossy under conditions of pasteurization and immersion in ice water.

Another object of the invention is to provide a better appearance of the label which has no visible edges attributable to the presence of adhesive and topcoat areas.

These and other objects of the invention will become more apparent from the discussion below.

SUMMARY OF THE INVENTION

The current invention achieves the desired characteristics of heat activation, adhesion to glass, aluminum, and plastics substrates, abrasion resistance, and chemical resistance by utilizing pigmented solutions of blends of epoxy and phenoxy resins combined with a melamine formaldehyde cross-linking agent and an amine neutralized acid phosphate or an amine neutralized p-toluene sulfonic acid blocked catalyst. The resulting formulations are low enough in viscosity to be applied by flexographic or gravure coaters and presses. The dried films of these products have excellent interlayer adhesion in areas where multiple ink layers overlap.

According to a first embodiment of the invention, the heat-transfer label is particularly well-suited for use on silane-treated glass containers of the type that are subjected to pasteurization conditions, regardless of whether the glass containers have been pre-treated previously with polyethylene, oleic acid, stearate or the like. The heat transfer label comprises (a) a support portion consisting of a sheet of paper or film overcoated with a layer of releasable material such as polyethylene and (b) a transfer portion over said support portion for transfer of the transfer portion from the support portion to an article, upon application of heat to the support portion, and placing the transfer portion in contact with the article.

According to another aspect of the invention, the heat-transfer label is particularly well-suited for use on aluminum cans that have been treated with a highly lubricating acrylic coating or varnish of the type used to prevent scratching and abrasion of such cans (said varnish either being used alone or in combination with a white ink). The heat-transfer label comprises (a) a support portion consisting of a sheet of paper or film overcoated with a layer of releasable material such a polyethylene and (b) a transfer portion over said support portion for transfer of the transfer portion from the support portion to an article, upon application of heat to the support portion, and placing the transfer portion in contact with the article.

It is to be understood that certain terms used herein, such as “on” or “over”, when used to denote the relative positions of two or more layers of the heat transfer label are primarily used to denote such relative positions in the context of the way in which those layers are situated prior to transfer of the transfer portion of the label to an article since, after transfer, the arrangement of layers is inverted as those layers that were furthest removed from the associated support sheet are now closest to the labelled article.

DETAILED DESCRIPTION OF THE INVENTION

Figure 1:
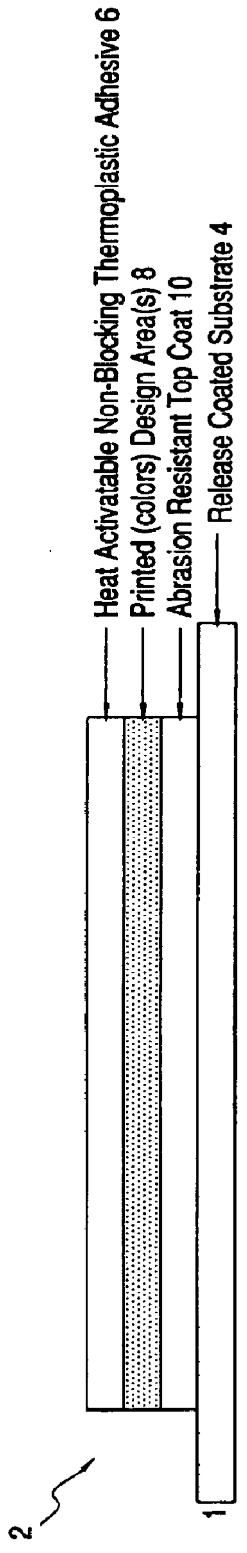
FIG.1 Prior Art
FIG. 1 is a schematic cross-sectional view of the heat transfer label currently being used for labelling articles.
Figure 2:
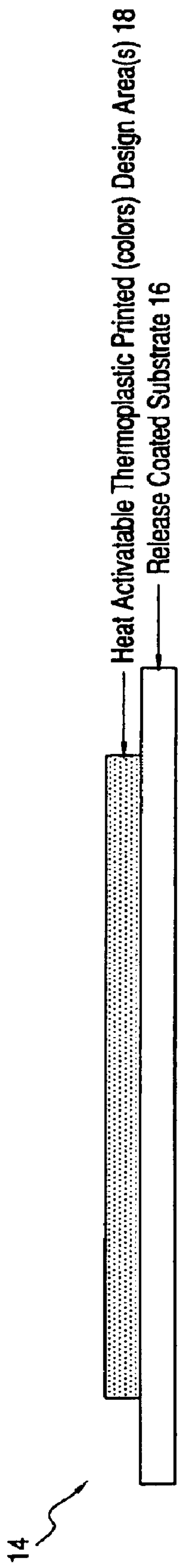
FIG. 2 is a schematic cross-sectional view of the new label described in this application.

The invention herein perhaps can be better appreciated by making reference to the drawings. FIG. 1 is a schematic cross-sectional view of a prior art labeling system 2, wherein a release contact substrate 4 has been applied to a multi-layer composition comprising a heat activiatable adhesive layer 6, a colored solid or design area 8, and an abrasion resistant coating 10. In FIG. 2 a heat transfer labelling system 14 according to the invention comprises a support portion 16 and a transfer portion 18. Support portion 16, in turn, comprises a substrate or carrier web overcoated with a polyethylene release layer. The carrier web is made typically of paper or a similarly suitable substrate. Details of the composition and preparation of polyethylene layer are disclosed, for example, in U.S. Pat. Nos. 4,935,300 and 4,927,709, both of which are specifically incorporated herein by reference.

Label 14 optionally comprises a skim coat (not shown), which is coated directly on top of the entirety of the polyethylene layer. During label transfer, a small portion of the skim coat may be transferred along with the transfer portion of the label onto the article being labelled, the amount of skim coat transferred onto the article being labelled not being readily discernible.

Transfer portion 18 contains a solid printed area or an ink design layer printed onto the release coated substrate described above.

The coating compositions utilized in the above-described application are comprised of blends of epoxy and phenoxy resins combined with pigments, a highly monomeric proprietary grade of methyl/butyl coetherified melamine-formaldehyde resin, an amine neutralized acid phosphate or an amine neutralized p-toluene sulfonic acid blocked catalyst, and a combination of volatile methyl ethyl ketone (CAS#78-93-3) and toluene (CAS#108-88-3) aromatic hydrocarbon solvents.

Additional coating compositions based upon blends of polyester resins and used in the labelling system described above have been developed specifically for labelling plastic containers including those fabricated from polyester, polyethylene, polyethylene naphthenate, polyethylene terephthalate-glycol modified (PETG), polyvinyl chloride, and polycarbonate.

The coating compositions used in this invention are preferably based on the following components:

The resin mixture used in the ink formulations for application to glass and aluminum cans preferably consists of blends of Epon 1007F and Paphen PKHB phenoxy resins. The resin mixture used in the ink formulations for application to plastic containers preferably consists of blends of saturated polyester resins.

Epon 1007F is a bisphenol A /epichlorhydrin based-epoxy resin having a viscosity of 50 to 100 centipoises when dissolved at forty percent by weight in methyl ethyl ketone, a melt viscosity of approximately five hundred poise at 150 Centigrade, a melt point of 120° to 130° C., and an epoxy equivalent weight (the weight of the resin, in grams, which contains one gram equivalent of epoxide) of 1700 to 2300. This resin is a proprietary product supplied by Resolution Performance Products Company, 3200 Southwest Freeway,. Houston, Tex. 77027.

The phenoxy resin PKHB is a solid poly(hydroxyether) phenoxy resin (CAS#25068-38-6) with the chemical structure:

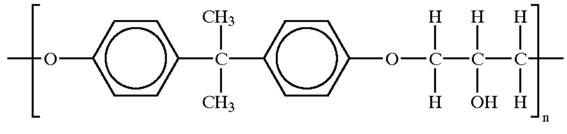

This resin, which has a molecular weight, Mw/Mn 32000/10000 (where n=38 to 60), and glass transition temperature of 84° C., is supplied by InChem Corp., 800 Cel-River Road, Rock Hill, S.C. 29730.

The cross-linking agent used as latent reactant with the hydroxyl groups on the epoxy and phenoxy resins is the highly monomeric proprietary grade of methyl/butyl coetherified melamine-formaldehyde resin containing almost no functional groups such as imino or methylol. This latter property contributes to extremely good hydrolytic stability, which results in reduced viscosity increase. The specific melamine-formaldehyde resin used in the coating formulation is Resimene CE-7103, a clear, colorless, semi-viscous liquid having a pH of 7.0, a solids content of 98% minimum, a free formaldehyde content of 0.1% maximum, which is supplied by Solutia, Inc., 10300 Olive Boulevard, St. Louis Mo. 63166-6760.

The blocked catalyst used in the formulations of the invention provides greater package stability and reduces catalyst-pigment interactions. Preferably the catalyst is an amine neutralized acid phosphate catalyst Nacure 4575, supplied as a twenty five percent active solution in a methanol/butanol solvent mixture or an amine neutralized p-toluene sulfonic acid, or Nacure XP-357, supplied as a twenty percent active solution in methanol. Both of these can be obtained from King Industries, Inc. Science Road, Norwalk, Conn. 06852.

Examples of polyester resins used in forming the polyester inks include: (1) Dynapol L490, a saturated high molecular weight, slightly branched copolyester having an acid number of 3 or less, a hydroxyl number of 9 or less, a molecular weight of 15,000, a glass transition temperature or 40° C. and a softening temperature of 130° C., and (2) Dynapol LH 831-24, a saturated, linear, low molecular weight polyester having an acid number of 7 or less, a hydroxyl number of 45 to 55, a glass transition temperature of 10° C., and supplied as a seventy percent solids solution in light aromatic naphtha/ethylene glycol monobutyl ether 80/20 combination. These polyester resins are available from Creanova, Inc., 220 Davidson Avenue, Somerset, N.J. 08873.

Another suitable resin for use in forming a polyester ink is Vitel 2700B, a copolyester resin, having the tensile strength of 6500 psi, 3% elongation, an acid number of 1 to 3, a hydroxyl number of 3 to 6, a molecular weight of 40,000 (Mn) and 74,000 (Mw), and a glass transition temperature of 47° to 50° C. This resin is manufactured by Bostik Findley Inc., Middleton, Mass. 01949.

Suitable vinyl chloride-vinyl acetate polymers include VAGH and VROH, proprietary resins manufactured by the Union Carbide subsidiary of the Dow Chemical Company, Midland Mich. 4864.

Examples of pigments utilized in the epoxy-phenoxy and polyester inks include Kronos 2020 Titanium Dioxide (C.I Pigment White 6) supplied by Kronos Inc., Houston, Tex.; Regal 330R Carbon Black (C.I. Pigment Black 7) supplied by Cabot Corporation, Billerica, Mass.; Irgazin DPP Scarlet EK (CI Pigment Red 225) supplied by CIBA Specialty Chemicals Corporation, High Point, N.C.; 11-11011 Permanent Yellow G (C.I. Yellow 14) supplied by Clariant Corporation, Coventry, R.I., and Phthalo Blue 8530 (C.I. Pigment Blue 1504) supplied by Peer Chemical Corporation, Wheeling, Ill.

Metalure L-53520 is a proprietary product of Eckart America, L.P., Painesville, Ohio 44077-0747.

EXAMPLES

The following are illustrative examples of composition that may be used to form the inks used in the labelling systems usefull according to the invention. It should be understood that other epoxy, phenoxy, and polyester resins and compositions of the general type described above also may be used in the inks and that the examples shown below are in no way intended to be limiting.

| | % BY WEIGHT |
|---|---|
| EXAMPLE I | |
| Toluene | 15.00 |
| Methyl Ethyl Ketone | 31.00 |
| PKHB | 12.00 |
| Epon 1007F | 6.00 |
| Kronos 2020 | 30.00 |

-continued

| | % BY WEIGHT |
|---|---|
| Resimene CE-7103 | 5.00 |
| * Nacure 4575 | 1.00 |
| | 100.00 |
| EXAMPLE II | |
| Toluene | 22.75 |
| Methyl Ethyl Ketone | 46.50 |
| PKHB | 12.00 |
| Epon 1007F | 6.00 |
| Regal 330R Black | 8.00 |
| Resimene CE-7103 | 4.00 |
| * Nacure 4575 | 0.75 |
| | 100.00 |
| EXAMPLE III | |
| Toluene | 22.75 |
| Methyl Ethyl Ketone | 46.50 |
| PKHB | 12.00 |
| Epon 1007F | 6.00 |
| Irgazin DPP Scarlet EK | 8.00 |
| Resimene CE-7103 | 4.00 |
| * Nacure 4575 | 0.75 |
| | 100.00 |
| EXAMPLE IV | |
| Toluene | 22.75 |
| Methyl Ethyl Ketone | 46.50 |
| PKHB | 12.00 |
| Epon 1007F | 6.00 |
| 11-1101 Permanent Yellow G | 8.00 |
| Resimene CE-7103 | 4.00 |
| * Nacure 4575 | 0.75 |
| | 100.00 |
| EXAMPLE V | |
| Toluene | 22.75 |
| Methyl Ethyl Ketone | 46.50 |
| PKHB | 12.00 |
| Epon 1007F | 6.00 |
| Phthalo Blue 8530 | 8.00 |
| Resimene CE-7103 | 4.00 |
| * Nacure 4575 | 0.75 |
| | 100.00 |
| EXAMPLE VI | |
| N-Propyl Acetate | 6.00 |
| Methyl Ethyl Ketone | 30.00 |
| Dynapol L-490 | 12.00 |
| Dynapol LH 831-24 | 18.00 |
| Kronos 2020 | 34.00 |
| | 100.00 |
| EXAMPLE VII | |
| N-Propyl Acetate | 25.20 |
| Methyl Ethyl Ketone | 38.00 |
| Dynapol L-490 | 9.60 |
| Dynapol LH 831-24 | 12.80 |
| Vitel 2700 B | 6.40 |
| Regal 330r Black | 8.00 |
| | 100.00 |
| EXAMPLE VIII | |
| N-Propyl Acetate | 22.69 |
| Methyl Ethyl Ketone | 35.18 |
| Dynapol L 490 | 9.38 |
| Vitel 2700 B | 6.25 |
| Dynapol LH 831-24 | 12.50 |
| Irgazin DPP Scarlet EK | 14.00 |
| | 100.00 |

-continued

| | % BY WEIGHT |
|---|---|
| EXAMPLE IX | |
| N-Propyl Acetate | 25.70 |
| Methyl Ethyl Ketone | 38.50 |
| Dynapol L 490 | 9.60 |
| Vitel 2700 B | 6.40 |
| Dynapol LH 831-24 | 12.80 |
| 11-1101 Permanent Yellow G | 7.80 |
| | 100.00 |
| EXAMPLE X | |
| N-Propyl Acetate | 25.20 |
| Methyl Ethyl Ketone | 38.00 |
| Dynapol L 490 | 9.60 |
| Vitel 2700 B | 6.40 |
| Dynapol LH 831-24 | 12.80 |
| Phthalo Blue 8530 | 8.00 |
| | 100.00 |
| EXAMPLE XI | |
| Toluene | 13.0 |
| Methyl Ethyl Ketone | 34.3 |
| Vinyl Chloride-Vinyl Acetate Polymers | 15.0 |
| Resimene CE 7103 | 10.0 |
| Nacure XP-357 | 0.7 |
| Metalure L-53520 | 20.0 |
| Irgazin DPP Scarlet EK | 4.0 |
| 11-1101 Permanent Yellow G | 3.0 |
| | 100.0 |

* or Nacure XP-357
Note:
In the above examples the ratio of the PKHB and Epon 1007 F can vary from about 0 to 100%.

In the above examples, the epoxy and polyester resins are added to the organic solvent mixture under agitation, and the mixture is mixed until the resins dissolve. Under continued mixing of the solution formed, the pigments are added so that the pigments are well dispersed.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A method of labelling an article comprising the steps of:

(a) providing a heat-transfer label having a support portion, and a transfer portion over said support portion for transfer of the transfer portion from the support portion to the article;

applying heat to the support portion;

placing, upon applying heat, the transfer portion in contact with the article, said transfer portion comprising a single or multiple color design;

transferring said transfer portion from said support portion to the article; and providing the design of the transfer portion using a solvent-based phenoxy-epoxy ink; the solvent-based phenoxy-epoxy ink comprising one or more pigments, a blend of solid phenoxy-epoxy resins dissolved in methyl ethyl ketone/toluene combinations combined with a highly monomeric methyl-butyl coetherified melamine formaldehyde resin, and an amine neutralized acid phosphate catalyst in methanol/butanol or an amine neutralized p-toluene sulfonic acid catalyst in methanol for use as a latent heat curable dried coating (ink) that, upon drying and subsequent exposure to temperatures of 375° to 400° F. for less than one minute during the heat transfer process will develop outstanding adhesion, heat resistance, solvent resistance, caustic resistance, and abrasion resistance.

2. A method of labelling an article comprising the steps of:

providing a heat-transfer label having a support portion, and a transfer portion over said support portion for transfer of the transfer portion from the support portion to the article;

applying heat to the support portion;

placing, upon applying heat, the transfer portion in contact with the article, said transfer portion comprising a single or multiple color design;

transferring said transfer portion from said support portion to the article; and providing the design of the transfer portion using a solvent-based polyester ink, the solvent-based polyester ink comprising one or more pigments, blends of polyester resins ranging in glass transition temperatures from 10° C. to 105° C. dissolved in n-propyl acetate/methyl ethyl Ketone combinations for use as a labeling material that upon drying and subsequent exposure to temperatures of 375° to 400° F. for less than one minute during the heat transfer process will develop outstanding adhesion to a surface.

3. A method of labelling an article comprising the steps of:

providing a heat-transfer label having a support portion, and a transfer portion provided without a separate heat activatable adhesive layer;

providing the transfer portion over said support portion;

applying heat to the support portion;

placing, upon applying heat, the transfer portion in contact with the article, said transfer portion comprising a single or multiple color design;

transferring said transfer portion from said support portion to the article; and providing the design of the transfer portion using a solvent-based phenoxy-epoxy ink; the solvent-based phenoxy-epoxy ink comprising one or more pigments, a blend of solid phenoxy-epoxy resins dissolved in methyl ethyl ketone/toluene combinations combined with a highly monomeric methyl-butyl coetherified melamine formaldehyde resin, and an amine neutralized acid phosphate catalyst in methanol/butanol or an amine neutralized p-toluene sulfonic acid catalyst in methanol for use as a latent heat curable dried coating (ink) that, upon drying and subsequent exposure to temperatures of 375° to 400° F. for less than one minute during the heat transfer process will develop outstanding adhesion, heat resistance, solvent resistance, caustic resistance, and abrasion resistance.

* * * * *